United States Patent Office 3,346,445
Patented Oct. 10, 1967

3,346,445
PRESS PACKING SHEET OF A FIBROUS WEB IMPREGNATED WITH POLYURETHANE AND METHOD OF MAKING SAME
Philip T. Gay, Walpole, Mass., assignor to Hillingsworth & Vose Company, East Walpole, Mass., a corporation of Massachusetts
No Drawing. Filed Dec. 1, 1964, Ser. No. 415,153
9 Claims. (Cl. 162—136)

ABSTRACT OF THE DISCLOSURE

A press packing sheet for use in the printing art comprising a non-woven porous fibrous web impregnated with an elastomeric, cross-linkable polyurethane material bonded to the fibrous web, the press sheet including 50 to 150 parts by weight of the polyurethane material to 100 parts of the fibrous web and being characterized by a bulk factor from 7 to 17 pounds per point, a compressibility from 11 to 40 percent and a compression recovery greater than 50 percent, the compressibility being the percent the sheet compresses in thickness under a load of 200 pounds per squar inch and the compression recovery being the percent the sheet recovers in thickness within 60 seconds after a load of 2000 pounds per square inch, maintained for 60 seconds, has been released.

---

*Press packing sheets and method of making same*

This invention relates to press packing sheets or tympan sheets for packing the impression cylinders of printing presses and, more particularly, to a non-woven fibrous sheet which is saturated with a cross-linked elastomeric polyurethane.

In many rotary printing presses, the printing unit consists essentially of two rotary cylinders, one (the printing cylinder) for carrying the type and the other (the impression cylinder) for pressing the sheet to be printed against the type. The printing elements on the printing cylinder frequently have surface irregularities and it is common practice to pack the surface of the impression cylinder with a compressible resilient press packing sheet, also known as a tympan sheet, to compensate for the irregularities. Some of the most important characteristics of the ideal packing sheet are:

(1) Ability to maintain uniform printing pressure, i.e. low compressibility and high recovery;
(2) Dimensional stability and resistance to sliding and creeping on the press;
(3) Resistance to damage by batters;
(4) Ability of compressed or damaged areas to be repaired when treated with water or glycerine.
(5) Resistance to clean-up oil and solvents;
(6) Ability to resist permanent deformation under high speed printing pressures;
(7) Ease of application to the press; and
(8) Resistance to cracking when folded.

Although the prior art has provided many different types of packing sheet having some of these characteristics (e.g. Thomas Patent No. 2,165,317 and Hechtman Patent No. 3,053,718), none have satisfactorily fulfilled the printer's basic requirements of better quality printing, less press "down time" and increased production. The best packings presently available are, due to their multi-ply construction, extremely expensive and easily damaged if folded or subjected to shearing stress.

An object of the present invention is to provide a superior, single layer press packing sheet.

Another object is to provide a press packing sheet comprising, in a single layer, a porous fiber matrix reinforced with a cross-linked, elastomeric polyurethane material and characterized by its controlled compressibility, good recovery, high lateral dimensional stability and ease of application to the press cylinder.

Other objects will appear hereinafter.

The present invention accomplishes the above-mentioned objects by providing a uniform caliper, single-ply press packing sheet comprising a non-woven fibrous web impregnated with an elastomeric cross-linked, polyurethane material. The polyurethane material is bonded to the web with a simple oven cure and is present in the sheet in the amount of 50 to 150 parts by weight to 100 parts of the web. The finished sheet has a compressibility of 11 to 40 percent, a compression recovery of greater than 50 percent, a bulk factor of 7 to 17 pounds per point and a MIT fold strength in excess of 1000 cycles. In commerical trials, sheets constructed according to the present invention have withstood over 7,000,000 impressions; conventional tympan or press packing sheets normally last for only 100,000 to 500,000 impressions.

For a fuller understanding of the nature and objects of the present invention, reference should be had to the following detailed description and examples illustrating specific embodiments thereof.

Definitions for the physical properties which are cited throughout this specification are as follows:

*Bulk factor* is the total weight in pounds of a 3000 square foot ream divided by the caliper in "points" or mils.

*Caliper* is the thickness in mils, i.e., thousandths of an inch.

*Compressibility* is the percent the sheet compresses in thickness under a load of 200 pounds per square inch, this being the standard pressure used on many printers' caliper instruments.

*Compression* recovery is the percent the sheet recovers in thickness within 60 seconds after a load of 2000 pounds per square inch, maintained for 60 seconds, has been released.

*MD tensile* is the tensile strength of the paper in pounds per inch width measured in the machine direction of the paper.

*MIT fold* is the number of folds to which the impregnated sheet can be subjected before failure in accordance with TAPPI specification T 423M–50 at a load of 1.5 kilograms in the machine direction of the sheet.

*Rogers freeness* is the number of seconds required to drain 400 milliliters of water from 600 milliliters of pulp slurry containing 2 grams dry weight of pulp held in an open-topped vertical cylindrical container having an inside diameter of 1⅞ inch through a bottom screen having a mesh of 40 x 50.

The press packing sheet constructed according to the present invention is similarly designed for use as an underpacking (below a relatively thin, hard-surfaced top sheet), and is of single-ply construction. The sheet is formed by saturating a basic web with a cross-linkable elastomeric polyurethane prepolymer using a conventional saturating press or similar equipment, and curing the saturated web, typically in an oven open to the atmosphere. If the sheet is to be used as a top press packing sheet where extra smoothness is required its smoothness can be enhanced by subjecting one or both of the surfaces of the cured sheet to a hot platen or calender roll.

The web is formed of a harsh, free draining pulp having a Rogers freeness of less than 200 seconds and, preferably, from 5 to 40 seconds. A free draining pulp is required to insure that the web is porous enough to accept approximately an equal amount (dry weight) of polyurethane impregnate. The pulp used may be a highly purified 100 percent kraft wood pulp, a strong kraft pulp, to which a portion of synthetic fiber has been added, or other paper making pulps, such as those obtained from Manila hemp and rag. Although the exact type of pulp is not critical to the practice of the invention, it is important that the finished web have bulk factor between 3 and 9 pounds per point, 5 to 7 pounds per point being preferred, to achieve the desired compressibility in the final press packing sheet. The web may be either air-laid or water-laid although the latter is preferred. A sanding or buffing step may be used to achieve uniform gauge if desired, although the unique properties of the sheet of the present invention make this unnecessary in most cases.

Elastomeric, cross-linkable polyurethanes are uniquely suitable for use as impregnates in the practice of this invention. By using polyurethane compositions to saturate the fibrous web previously described, it is possible to achieve a combination of compressibility, resilience, strength, oil resistance and dimensional stability heretofore unobtainable.

There are various methods of formulating the polyurethane components used to produce a press packing sheet having the desired properties. The preferred method is by reacting polyisocyanates with hydroxyl-bearing compounds such as glycols, polyesters and polyethers.

It is possible to practice the invention by mixing all the basic components in one vessel and directly saturating the fibrous web, but the high reactivity of the components at room temperature necessitates immediate usage to avoid premature polymerization. The preferred practice, therefore, is to prepare prepolymers which are relatively stable at room temperature. Depending upon their particular composition, the prepolymers may be activated in various ways, such as adding the cross-linking agent just prior to use, adding a catalytic ingredient, raising the temperature to promote reaction, or subjecting the prepolymer to humid atmosphere to promote cross-linking by moisture.

Any polyurethane which is elastomeric and cross-linkable may be used in the practice of the present invention. Suitable polyurethane prepolymers may be produced from linear polyesters prepared by reacting polyhydric alcohols having from two to four carbon atoms, for example, ethylene and propylene glycols, diethylene glycol, 1,4-butanediol, butylene glycol, or mixtures thereof with polycarboxylic acids, for example, aliphatic dicarboxylic acids having from four to ten carbon atoms, such as adipic, pimelic, sebacic, glutaric and succinic acids, and mixtures thereof using an excess of the alcohol over the acid so that the resulting linear polyester contains terminal hydroxyl groups. The polyester is then reacted with an excess of any suitable diisocyanate, for example, aromatic diisocyanates, such as 2,4-toluene diisocyanate; naphthalene-1,5-diisocyanate; p,p'-diphenylmethane diisocyanate, and also aliphatic diisocyanates, such as, hexamethylene diisocyanate, to insure the presence of free isocyanate groups in the prepolymer, that is, an isocyanate-terminated polyester. Such polyesters are capable of subsequent reaction with polyfunctional cross-linking agents, such as, di- and other polyhydroxy compounds, and di- or other polyamines with and without catalysts, such as those of the tertiary amine type. Such reactions extend the linear chains and cross-link the polymer to an elastomeric state when the proper proportioning of the prepolymer and of curing agent is observed.

Prepolymers suitable in practicing the invention may also be made from polyalkyleneether glycols, commonly referred to as polyethers, which like the polyesters are reactable with diisocyanates to provide diisocyanate modified, that is, isocyanate-terminated polyalkyleneethers. These in turn may be cross-linked to elastomeric polyurethanes through reaction with polyols such as di- and polyhydric alcohols of various types well known in this art, or with polyamines or amino-alcohols. Polyethylene glycols, polypropylene glycols, and other polyethers, such as polytetramethylene ether glycol may be mentioned as illustrative. Other polymeric glycols are suitable, such as polyalkylenethioether glycols, and polyalkylene-arylene-ether glycols and thioether glycols.

The polyesters and polyethers useful in making prepolymers for this invention include those having an acid number less than 1.0, a maximum water content of 0.1 percent and a hydroxyl number of about 45 to 65.

The isocyanate-terminated prepolymers may advantageously be blocked or capped, that is, the terminal isocyanate groups may be reacted to stabilize the prepolymer against premature cure by atmospheric moisture. The capping agent may be any active hydrogen substance which may be volatilized or removed upon regeneration to free the isocyanate groups. Preferably, these isocyanate precursors or blocked polymers should be decomposable at temperatures not over about 250° to 300° F. Examples of blocking agents are diethyl malonate, ethyl acetoacetate, sodium bisulfite and methyl ethyl ketoxime. Such blocked prepolymers are preferred for use in the present invention.

Although the web may be saturated from an aqueous dispersion (latex) or solution of a prepolymer provided that either (1) the dispersion or solution is sufficiently fresh so that no excessive reaction has occurred between the water and the isocyanate groups of the polymer or (2) the isocyanate terminal groups in the polymer are blocked as described above to prevent reaction with the water, it is preferred to saturate the web from an organic solvent solution rather than from an aqueous because the penetration of the web is more complete and the essential features more readily obtained from a solvent system. The solvent may be selected from numerous materials in which polyurethane components are soluble. Examples are methylene chloride, Cellosolve acetate, acetone, and toluene. Choice of solvent depends upon viscosity and evaporation characteristics as well as consideration for limitations on ventilation and safety control available in the processing area. If a nonblocked polyurethane prepolymer is used, that is the material contains free isocyanate groups, it is desirable to employ a so-called "urethane grade" solvent in which the moisture and other active hydrogen-bearing materials have been reduced to a minimum in order to prevent reaction with the isocyanate. When aqueous dispersions are employed as the saturant it is difficult to obtain adequate penetration of the prepolymer into the center of the web, and it may be desirable to use vacuum impregnation techniques to improve the uniformity of distribution of the impregnant.

The concentration of the saturant or impregnant is not critical except as is necessary to obtain the desired content in the base web. Approximately 50–80 percent solids with toluene as the diluent or solvent has been found satisfactory.

The solution of polyurethane saturant may be applied to the web by using conventional saturating equipment. Satisfactory results have been obtained using conventional press equipment with a pair of steel rolls, the lower roll revolving in a tub containing the polyurethane saturant. The web passes between the rolls and is flooded with saturant introduced from above as well as from the lower roll.

The saturated web may be dried and cured either in a two step process or, preferably, by continuous heating. One of the major advantages of the present invention is that an open oven may be used to cross-link the polyurethane as necessary to develop the optimum properties in the final press sheet. A curing time of 5 minutes at 300° F., or the equivalent, is satisfactory under most conditions. The required curing temperature depends on the temperature at which the blocked polymers are activated. By using catalysts it is possible, in some cases, to reduce the time for cross-linking to less than one minute.

The press packing sheet constructed according to the present invention is designed to have a compressibility in the range of 11 to 40 percent and, more preferably, in the range of 13 to 23 percent, a compression recovery greater than 50 percent, and an MIT fold strength greater than 1000 cycles.

To produce a press packing sheet having the desired characteristics, it has been found desirable to impregnate the web with approximately 50 to 150 parts by weight of polyurethane material to 100 parts of web. However, substantial improvements in the strength and resilience of the web have been found with as little as 10 parts or as much as 200 parts polyurethane per 100 parts web. Insofar as bulk factor affects the compressibility of the impregnated web, it has been found that the finished press sheet should have a bulk factor in the range of 7 to 17 pounds per point to insure the desired compressibility. The preferred range of bulk factor is 11 to 13 pounds per point.

The following examples will more clearly illustrate the advantages of press sheets constructed in accordance with the present invention. They are given by way of illustration and are not intended to limit the scope of the invention.

*Example 1*

A fibrous water-laid web was prepared from an ethylated wood pulp (Ethynier R-2042 produced by the Raynier Corp.) having a Rogers freeness of 12 seconds, the web having a caliper of 0.031 inch and a bulk factor of 6.6 pounds per point. This web was impregnated with a blocked isocyanate terminated polyester material (Unithane 100-T produced by Thiokol Chemical Corp.) in the proportion of 96 parts by weight of resin to 100 parts fiber and cured in a hot air oven for approximately 5 minutes at 270° F. The physical characteristics of the cured sheet and of press sheets of conventional manufacture were measured and compared as shown in Table A below:

TABLE A

|  | Example 1 | Conventional Wood Pulp Sheet |
|---|---|---|
| Bulk Factor | 12.8 | 12.1 |
| Construction | (1) | (2) |
| Caliper, inch | 0.034 | 0.026 |
| Compressibility, percent | 18 | 10 |
| Compression Recovery, percent | 69 | 71 |
| MD Tensile (lbs./in.) | 128 | 200 |
| 1.5 kg MIT Fold (cycles) | 8,300 | 536 |

1 One-layer saturated.
2 One-layer wood fiber.

In a commercial trial run, the packing of Example 1 withstood 7,000,000 impressions, far more than can be obtained from the sheet of conventional construction. Moreover, the sheet of Example 1 displayed marked superiority in folding strength, as shown by the MIT fold results, to sheets of conventional construction.

*Example 2*

A fibrous water-laid web was prepared from a mixture of 75 percent wood pulp (having a 90 percent alpha kraft content) and 25 percent nylon synthetic fiber (6 denier, ½ inch with papermakers finish) having a Rogers freeness of 35 seconds. The web had a caliper of 0.035 inch, and a bulk factor of 5.2 pounds per point, and was impregnated as in Example 1 in the proportion of 110 parts by weight polyurethane material to 100 parts fiber. The saturated web had a bulk factor of 9.9 pounds per point, a compressibility of 27 percent, a compression recovery of 70 percent, and MD tensile strength of 100 pounds per square inch and an MIT fold strength of 1800 cycles. In a commercial trial, the press sheet withstood over 3,500,000 impressions.

*Example 3*

A fibrous water-laid web was prepared from a mixture of 85 percent wood pulp (having a 90 percent alpha kraft content) and 15 percent nylon synthetic fiber (3 denier, ¼ inch with papermakers finish) having a Rogers freeness of 14 seconds. The web, having a caliper of 0.032 inch and a bulk factor of 6.5 pounds per point, was impregnated as in Example 1 in the proportion of 65 parts by weight of polyurethane material to 100 parts fiber. The saturated web had a bulk factor of 11 pounds per point, a compressibility of 20 percent, a compression recovery of 65 percent, an MD tensile strength of 136 pounds per square inch and an MIT fold strength of 9100 cycles.

*Example 4*

To illustrate the outstanding characteristics of the present invention, 25 percent by weight of 6 denier ½ inch papermakers nylon was blended with 75 percent of purified kraft wood pulp. The pulp blend was beaten at a consistency of one percent fiber to water in a laboratory Valley beater until the Rogers freeness reached a value between 7 and 10 seconds. From this pulp handsheets were made using a conventional laboratory handsheet maker. The sheets were made at a weight corresponding to 167 pounds per 3000 square feet ream, were dried on a rotary steam drier and pressed under 300 p.s.i., and then dip saturated with various elastomers. The excess saturant was removed by blotters and the sheets were dried and subsequently cured in a circulating air oven for 5 minutes at 300° F. The concentration of each saturant was adjusted to provide approximately 100 parts by weight elastomer to 100 parts fiber. As shown below the polyurethane impregnated sheet of the present invention exhibited a unique combination of high tensile strength, low elongation and high compression recovery.

| Type of Saturant | Saturated Caliper | Tensile, lb./in., Width | Percent Elongation at Break | Percent Compression at 200 p.s.i. |
|---|---|---|---|---|
| (A) Butadiene-Acrylonitrile Copolymer Latex | .035 | 66 | 43 | 26 |
| (B) Reactive Acrylate Latex | .037 | 66 | 73 | 34 |
| (C) Butyl Rubber Latex | .036 | 49 | 43 | 28 |
| (D) Neoprene Latex | .036 | 78 | 12 | 20 |
| (E) Carboxy-Nitrile Latex | .036 | 65 | 40 | 27 |
| (F) Polyurethane Material of Example 1 | .038 | 94 | 10 | 22 |

*Percent compression recovery*

(A) _____ 30    (D) _____ 33
(B) _____ 22    (E) _____ 42
(C) _____ 20    (F) _____ 64

Results similar to those obtained with product F are obtained when other elastomeric cross-linked polyurethanes are used, such as those derived from isocyanate terminated polyglycols.

*Example 5*

To illustrate the effect of adding varying quantities of synthetic fibers to the pulp furnish, a number of handsheets were prepared in a manner similar to Example 4, except that the percentage of nylon in the web was varied from 0 to 40 percent. All the sheets were impregnated in the proportion of approximately 100 parts by weight of the polyurethane material of Example 1 to 100 parts of fiber. All the finished press sheets exhibited a compression recovery greater than 50 percent. Very similar results are obtained using other synthetic fiber in place of nylon, such as polypropylene, polyester (Dacron), polyacrylate (Orlon), etc.

| Ratio of Nylon to Kraft Pulp | Percent Pick-up of Saturant | Tensile, lb./in.$^2$ | Percent Elongation at Break | Percent Compression Recovery |
|---|---|---|---|---|
| 0 | 103 | 131 | 16 | 51 |
| 10/90 | 101 | 120 | 13 | 61 |
| 20/80 | 94 | 115 | 13 | 58 |
| 30/70 | 110 | 98 | 22 | 64 |
| 40/60 | 112 | 84 | 30 | 73 |

*Example 6*

For the purpose of comparing properties at different levels of polyurethane impregnation, a number of samples of the web of Example 3 were impregnated with different quantities of saturant by changing solids of the saturating bath and by double saturation at pickup levels above 112 percent. Each sheet having greater than 12 percent polyurethane pickup, exhibited a compressibility and compression recovery in the preferred ranges.

Web Caliper: .034–.036 inch.
Web bulk factor: 5.75 pounds per point.
Saturant: Polyurethane (Thiokol "Unithane 100–T").

| Percent Polyurethane Pick-up | Oven Cure | MD Tensile | MD Tear | Percent Compression | Percent Compression Recovery |
|---|---|---|---|---|---|
| 0 | 20 min. at 250° F | 52 | 472 | 35 | 44 |
| 62 | 20 min. at 250° F | 133 | 1,024 | 21 | 62 |
| 77 | 20 min. at 250° F | 142 | 1,248 | 20 | 61 |
| 90 | 20 min. at 250° F | 149 | 1,168 | 16 | 66 |
| 112 | 30 min. at 250° F | 145 | 1,328 | 18 | 70 |
| 122 | 30 min. at 250° F | 116 | 1,216 | 16 | 69 |
| 148 | 30 min. at 250° F | 93 | 1,732 | 15 | 73 |

The commercial test runs cited above clearly demonstrated the superiority of the press sheet of this invention over conventional single-ply press sheets. The ease of manufacture, and high fold strength of the press sheets of the present invention are in sharp contrast to the previous existing multi-ply press sheets.

*Example 7*

The water-laid fibrous web of Example 3 was impregnated with a toluene solution containing 70 percent by weight of a polyether urethane prepolymer made by interaction of toluene diisocyanate with poly(1,4-oxybutylene)glycol (Adiprene L produced by du Pont) and 7.6 percent of 4,4′-methylene-bis-(2-chloroaniline) cross-linking agent. The impregnated web contained 113 parts of cross-linked prepolymer of each 100 parts of fiber and was cured in hot air at 250° F. for 30 minutes to produce a cured sheet having the following characteristics:

| | |
|---|---|
| Caliper | 0.034 |
| Compressibility _____percent | 13 |
| Compression recovery _____do | 73 |
| MD tensile (lb./in.) | 177 |
| MD elongation _____percent | 14 |
| 1.5 kg. MIT fold (cycles) | 1025 |

The same type of water-laid fibrous web was impregnated with a toluene solution containing 70 percent of the same prepolymer together with 5.1 percent of N,N,N′,N′-tetrakis(2-hydroxypropyl) ethylenediamine cross-linking agent. The impregnated web contained 104 parts by weight of cross-linked prepolymer for each 100 parts of fiber and was cured in hot air for 30 minutes at 250° F. to produce a sheet having the following characteristics:

| | |
|---|---|
| Caliper | 0.034 |
| Compressibility _____percent | 14.5 |
| Compression recovery _____do | 76.5 |
| MD tensile (lb./in.) | 172 |
| MD elongation _____percent | 9.5 |
| 1.5 kg. MIT fold (cycles) | 2310 |

Both of the sheets of this example were useful press packing sheets.

*Example 8*

Another press packing sheet in accordance with the invention was prepared by impregnating the fibrous web of Example 3 with a toluene solution containing about 58 percent by weight of a polyester prepolymer made by the interaction of a linear polyester having a molecular weight of about 2000, a hydroxyl number of 55, an acid number of 0.2, and a water content of 0.03 percent (Formrez F13–99 produced by Witco Chemical) with an 80/20 mixture of 2,4- and 2,6-toluene diisocyanate in the proportion of six parts of polyester to one of diisocyanate. The solution also contained about 3 percent by weight of the same ethylenediamine cross-linking agent described in Example 7.

The impregnated web, containing 101 parts of cross-linked polyurethane prepolymer for each 100 parts of fiber, was cured in air at 250° F. for four hours to produce a sheet having the following characteristics:

| | |
|---|---|
| Caliper | 0.034 |
| Compressibility _____percent | 16.5 |
| Compression recovery _____do | 57 |
| MD tensile | 169 |
| MD elongation _____percent | 11 |
| 1.5 kg. MIT fold (cycles) | 3272 |

*Example 9–11*

Samples of the fibrous sheets of Examples 1 and 3 were impregnated with toluene solutions of a variety of cross-linked polyurethanes and cured to produce sheets having characteristics as set forth in the following table:

|  | 9 | 10 | 11 |
|---|---|---|---|
| Fibrous Web | Example 1 | Example 3 | Example 3. |
| Polyesterurethane | Unithane 200 (Thiokol). | Solithane 291 (Thiokol) and triisopropanolamine. | Formrez P-611 (Witco) and triisopropanolamine. |
| Catalyst | Lead octoate | Lead octoate | Lead octoate. |
| Percent saturant on fiber | 100 | 110 | 119. |
| Cure at 250° F | 10 min | 60 min | 20 min. |
| Caliper | 0.034 | 0.034 | 0.034. |
| Compressibility | 22% | 16.5% | 15%. |
| Compression recovery | 61% | 62% | 66%. |
| MD Tensile | 120 | 160 | 165. |
| MD Elongation | 19% | 9% | 9%. |
| 1.5 kg MIT Fold | 14,900 | 6,240 | 997. |

*Example 12*

A sample of the water-laid fibrous web of Example 3 was impregnated by dipping in an aqueous solution of a blocked isocyanate terminated polyether urethane prepolymer (WS70, Thiokol Corp.) to produce a sheet having 100 parts by weight of prepolymer for each 100 parts of fiber. The impregnated sheet was dried and cured by heating for twenty minutes at 250° F. The product displayed a tensile strength (MD) of 160 pound/inch, a compressibility of 18 percent, and a compression recovery of 69 percent, as well as a very high wet strength. It was suitable for use as a press packing sheet.

Since certain changes may be made in the above product without departing from the scope of the invention herein involved, it is intended that all matter contained in the above description and examples shall be interpreted as illustrative and not in a limiting sense.

I claim:

1. The process of making a press packing sheet including the steps of: Forming a porous fibrous web having a bulk factor in the range of 3 to 9 pounds per point from a free draining fiber furnish having a Rogers freeness value from 5 to 40 seconds; drying the web; impregnating the web with 50 to 150 parts by weight of a polyurethane prepolymer to 100 parts of the web; and, curing the impregnated web to cross-link the polyurethane prepolymer and bond it to the web.

2. The process of forming a press packing sheet including the steps of: Forming a non-woven porous fibrous web having a bulk factor in the range of 3 to 9 pounds per point from a free draining fiber furnish having a Rogers freeness value from 5 to 40 seconds; drying the web; impregnating the web with 50 to 150 parts by weight of a polyurethane prepolymer comprising an isocyanate terminated polyester to 100 parts of the fibrous web; and, heating the impregnated web to cross-link the polyurethane prepolymer and bond it to the web.

3. The process of forming a press packing sheet including the steps of: Forming a non-woven porous fibrous web having a bulk factor in the range of 3 to 9 pounds per point from a free draining fiber furnish having a Rogers freeness value from 5 to 40 seconds; drying the web; impregnating the web with 50 to 150 parts by weight of a blocked polyurethane prepolymer comprising an isocyanate terminated polyester to 100 parts of the fibrous web; and, heating the impregnated web to cross-link the polyurethane prepolymer and bond it to the web.

4. The process of forming a press packing sheet including the steps of: Forming a non-woven porous fibrous web having a bulk factor in the range of 3 to 9 pounds per point from a free draining fiber furnish having a Rogers freeness value from 5 to 40 seconds; drying the web; impregnating the web with 50 to 150 parts by weight of a polyurethane prepolymer comprising an isocyanate terminated polyalkylene ether to 100 parts of the fibrous web; and, heating the impregnated web to cross-link the polyurethane prepolymer and bond it to the web.

5. The process of making a press packing sheet including the steps of: Forming a non-woven porous fibrous web having a bulk factor in the range of 3 to 9 pounds per point from a free draining fiber furnish having a Rogers freeness value from 5 to 40 seconds; drying the web; impregnating the web with 50 to 150 parts by weight of a blocked polyurethane prepolymer comprising an isocyanate terminated polyalkyleneether to 100 parts of the fibrous web; and, heating the impregnated web to cross-link the polyurethane prepolymer and bond it to the web.

6. A press packing sheet for use in the printing art comprising a non-woven porous fibrous web impregnated with an elastomeric, cross-linkable polyurethane material bonded to the fibrous web, the press sheet including 50 to 150 parts by weight of the polyurethane material to 100 parts of the fibrous web and being characterized by a bulk factor from 7 to 17 pounds per point, a compressibility from 11 to 40 percent and a compression recovery greater than 50 percent, the compressibility being the percent the sheet compresses in thickness under a load of 200 pounds per square inch and the compression recovery being the percent the sheet recovers in thickness within 60 seconds after a load of 2000 pounds per square inch, maintained for 60 seconds, has been released, and the web having a bulk factor in the range of 3 to 9 pounds per point in the absence of the impregnate.

7. The press packing sheet of claim 6 further characterized by an MIT fold of at least 1000 cycles, the MIT fold being the number of folds to which the sheet can be subjected before failure in accordance with TAPPI specification T 423M-50 at a load of 1.5 kilograms in the machine direction of the sheet, and in which the web in the absence of the impregnate has a bulk factor from 5 to 7 pounds per point.

8. The press packing sheet of claim 6 in which the sheet is further characterized by a bulk factor from 11 to 13 pounds per point and a compressibility from 13 to 23 percent and in which the web in the absence of the impregnate has a bulk factor from 5 to 7 pounds per point.

9. The press packing sheet of claim 8 further characterized by an MIT fold of at least 1000 cycles, the MIT fold being the number of folds to which the sheet can be subjected before failure in accordance with TAPPI specification T 423M-50 at a load of 1.5 kilograms in the machine direction of the sheet, and in which the web is formed from a purified kraft wood pulp.

References Cited

UNITED STATES PATENTS

| 3,061,475 | 10/1962 | Wallace | 117—155 |
| 3,178,310 | 4/1965 | Berger et al. | 117—155 X |
| 3,197,330 | 7/1965 | Bartell | 117—155 X |
| 3,238,010 | 3/1966 | Habib et al. | 162—168 X |

S. LEON BASHORE, *Primary Examiner.*

UNITED STATES PATENT OFFICE
CERTIFICATE OF CORRECTION

Patent No. 3,346,445                      October 10, 1967

Philip T. Gay

It is hereby certified that error appears in the above numbered patent requiring correction and that the said Letters Patent should read as corrected below.

In the heading to the printed specification, lines 5 and 6, for "Hillingsworth & Vose Company" read -- Hollingsworth & Vose Company --; column 1, line 24, for "squar" read -- square --.

Signed and sealed this 26th day of November 1968.

(SEAL)
Attest:

Edward M. Fletcher, Jr.                    EDWARD J. BRENNER

Attesting Officer                        Commissioner of Patents